(12) United States Patent
Cordier et al.

(10) Patent No.: US 12,374,925 B2
(45) Date of Patent: Jul. 29, 2025

(54) NFC CHARGING

(71) Applicant: STMicroelectronics (Rousset) SAS, Rousset (FR)

(72) Inventors: Nicolas Cordier, Aix-en-Provence (FR); Anthony Tornambe, Rousset (FR); Jeremy Quignon, Tourves (FR)

(73) Assignee: STMicroeletronics (Rousset) SAS, Rousset (FR)

( * ) Notice: Subject to any disclaimer, the term of this patent is extended or adjusted under 35 U.S.C. 154(b) by 655 days.

(21) Appl. No.: 17/676,729

(22) Filed: Feb. 21, 2022

(65) Prior Publication Data

US 2022/0271568 A1    Aug. 25, 2022

(30) Foreign Application Priority Data

Feb. 25, 2021  (FR) ........................................ 2101862
Jun. 29, 2021  (FR) ........................................ 2106989

(51) Int. Cl.
*H02J 50/20*   (2016.01)
*H02J 7/00*    (2006.01)
*H02J 50/80*   (2016.01)
*H04B 5/79*    (2024.01)

(52) U.S. Cl.
CPC ............ *H02J 50/20* (2016.02); *H02J 7/0047* (2013.01); *H02J 7/0063* (2013.01); *H02J 7/00712* (2020.01); *H02J 50/80* (2016.02); *H04B 5/79* (2024.01)

(58) Field of Classification Search
CPC ........ H02J 50/20; H02J 7/0047; H02J 7/0063; H02J 7/00712; H02J 50/80; H02J 50/12; H02J 7/02; H04B 5/79; H04B 5/72
USPC ........................................................ 320/108
See application file for complete search history.

(56) References Cited

U.S. PATENT DOCUMENTS

| | | | | |
|---|---|---|---|---|
| 6,476,585 B1 * | 11/2002 | Simmonds | ................ | H02J 7/02 320/134 |
| 8,390,249 B2 * | 3/2013 | Walley | ................ | H02J 7/00036 320/108 |
| 8,594,804 B2 * | 11/2013 | Joshi | .................... | A61N 1/3787 607/61 |
| 8,754,614 B2 * | 6/2014 | Paryani | ............... | H01M 10/443 320/160 |
| 9,728,995 B2 * | 8/2017 | Matsumura | ........... | H02J 7/0029 |
| 10,224,754 B2 * | 3/2019 | Kim | ........................ | H02J 50/12 |

(Continued)

FOREIGN PATENT DOCUMENTS

| | | | | |
|---|---|---|---|---|
| CN | 214429279 U | * | 10/2021 | ................ H02J 7/02 |
| WO | WO-2010093965 A2 | * | 8/2010 | ............... H02J 5/005 |
| WO | 2020206372 A1 | | 10/2020 | |

OTHER PUBLICATIONS

Y. Zhao, J. R. Smith and A. Sample, "NFC-WISP: A sensing and computationally enhanced near-field RFID platform," 2015 IEEE International Conference on RFID (RFID), San Diego, CA, USA, 2015, pp. 174-181 (Year: 2015).*

(Continued)

*Primary Examiner* — M Baye Diao
(74) *Attorney, Agent, or Firm* — Crowe & Dunlevy LLC

(57) ABSTRACT

A device includes: an NFC controller; a microcontroller; a charging circuit for an external battery; an energy recovery device; an antenna; and a switch. The NFC controller is configured to selectively control the switch in order to couple the energy recovery device to the charging circuit.

25 Claims, 8 Drawing Sheets

(56) References Cited

U.S. PATENT DOCUMENTS

| | | | | |
|---|---|---|---|---|
| 10,445,708 | B2* | 10/2019 | Hunt | G06Q 30/02 |
| 10,461,549 | B2* | 10/2019 | Hu | H02J 7/00 |
| 10,523,041 | B2* | 12/2019 | Liu | H02J 50/12 |
| 11,018,518 | B2* | 5/2021 | Wang | H02J 7/0071 |
| 11,080,672 | B2* | 8/2021 | Bowles | G07F 7/06 |
| 11,637,501 | B2* | 4/2023 | Bieber | H02M 3/33538 |
| | | | | 363/21.04 |
| 12,249,859 | B2* | 3/2025 | Paparrizos | H02J 50/10 |
| 2003/0167345 | A1* | 9/2003 | Knight | H04L 12/40006 |
| | | | | 701/1 |
| 2013/0225076 | A1* | 8/2013 | Rizzo | G06K 19/0709 |
| | | | | 455/41.1 |
| 2014/0152253 | A1 | 6/2014 | Ozaki et al. | |
| 2015/0065041 | A1 | 3/2015 | Ahn | |
| 2016/0365743 | A1* | 12/2016 | Huang | H04B 5/24 |
| 2018/0175676 | A1 | 6/2018 | Ikefuji et al. | |
| 2020/0313642 | A1 | 10/2020 | Mimino | |
| 2020/0382165 | A1* | 12/2020 | Tramoni | H04B 5/72 |

OTHER PUBLICATIONS

Full-functional Charger And Circuit Thereof (Machine Translation of CN 214429279 U) (Year: 2021).*
Meile Louis et al: "Wireless Power Transmission Powering Miniaturized Low Power IoT devices: A Revie", 2019 IEEE 8th International Workshop On Advances in Sensors and Interfaces (IWASI), IEEE, 13 juin 2019 (Jun. 13, 2019), pp. 312-317, XP033592312.
INPI Search Report and Written Opinion for priority application, FR 2101862, report dated Nov. 19, 2021, 9 pages.
EPO Search Report and Written Opinion for counterpart EP Appl. No. 22157883.4, report dated Jul. 13, 2022, 11 pgs.

* cited by examiner

NFC CHARGING

PRIORITY CLAIM

This application claims the priority benefit of French Application for Patent No. 2101862, filed on Feb. 25, 2021, and further claims the priority benefit of French Application for Patent No. 2106989, filed on Jun. 29, 2021, the contents of which are hereby incorporated by reference in their entireties to the maximum extent allowable by law.

TECHNICAL FIELD

The present disclosure relates generally to near field communication (NFC) devices, such as Internet of Things (IoT) devices, or the like. More specifically, the present disclosure relates to the wireless charging (WLC) of such devices.

BACKGROUND

In conventional devices, different antennas are used for NFC communications and for wireless charging.

More recently, attempts have been made to perform WLC wireless charging using NFC technology. However, the usual circuits are unsuitable for devices with small dimensions, such as IoT devices.

There is a need for an NFC charging solution suitable for small devices, such as IoT devices.

SUMMARY

Embodiments herein address all or some of the drawbacks of known solutions.

An embodiment of a device comprises: an NFC controller; a microcontroller; an external battery charging circuit; an energy recovery device; an antenna; and a switch that is controllable by the NFC controller for coupling the energy recovery device to the charging circuit.

One embodiment provides a method for operating a device comprising: an NFC controller; a microcontroller; an external battery charging circuit; an energy recovery device; an antenna; and a switch coupling the energy recovery device to the charging circuit, wherein the switch is controlled by the NFC controller.

According to one embodiment, said switch is in an open state during NFC communications in drive (reader) mode or in card mode.

According to one embodiment, said switch is in a closed state during wireless charging cycles.

According to one embodiment, the microcontroller generates a control signal for the charging circuit so as to regulate the charge current.

According to one embodiment, said charge current is adjusted based on the available field energy.

According to one embodiment, in the presence of a field emitted by an external charging device, at least the NFC controller and the charging circuit are powered by the field.

According to one embodiment, the microcontroller is also powered by the field.

According to one embodiment, in the presence of a field emitted by an external charging device, the NFC controller and/or the microcontroller cannot switch to NFC drive mode as long as the battery charge level is below a threshold.

According to one embodiment, in the presence of a field emitted by an external charging device, the microcontroller and/or the NFC controller is powered by the battery when the battery charge level is above a threshold.

According to one embodiment, in the presence of a field emitted by an external charging device, the NFC controller enters a standby mode during charging cycles.

According to one embodiment, in the presence of a field emitted by an external charging device, the microcontroller monitors the power available at the input of the charging circuit.

According to one embodiment, the switch is of the type that is normally open.

According to one embodiment, when the NFC controller detects an external wireless charging device emitting a field, the switch is closed for coupling the energy recovery device to the charging circuit.

According to one embodiment, the switch is of the type that is normally closed.

One embodiment provides a device comprising: an NFC controller; a microcontroller; a battery charger; an energy recovery device; an antenna; and a switch coupling the energy recovery device to the battery charger.

One embodiment provides a method for implementing the described device, wherein the switch is controlled by the NFC controller.

According to one embodiment, when the NFC controller detects a wireless charging polling circuit emitting a field, it closes the switch coupling the energy recovery device to the battery charger.

According to one embodiment, the microcontroller generates a control signal intended for the battery charger, so as to regulate the charge current.

According to one embodiment, said charge current is adjusted based on the available field energy.

According to one embodiment, in battery off mode, the default state of the switch is on, so that the charger is connected to the energy recovery device.

According to one embodiment, in battery off mode, at least the NFC controller and the battery charger are powered by the field.

According to one embodiment, the microcontroller is also powered by the field.

According to one embodiment, as long as the battery level is below a threshold, the charger requests the NFC controller and/or the microcontroller to remain in static mode.

According to one embodiment, when the battery level is above the threshold, the battery powers the microcontroller, which is no longer powered by the field through the charger.

According to one embodiment, during the charging phases, the NFC controller enters sleep mode.

According to one embodiment, the NFC controller monitors the received signal strength.

According to one embodiment, the microcontroller monitors the power available at the charger input.

According to one embodiment, if the field drops below a threshold, the microcontroller and the NFC controller wake up and: if a charging phase ends and a communication phase begins, the microcontroller makes the communication, via the NFC controller, to negotiate the charging protocol with the polling circuit; or if there is no available field, the charging stops.

According to one embodiment, adjustment of a matching circuit including the device is performed while the switch is open and the energy recovery device is on.

According to one embodiment, the device is configured to implement the described method.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Figure 1:
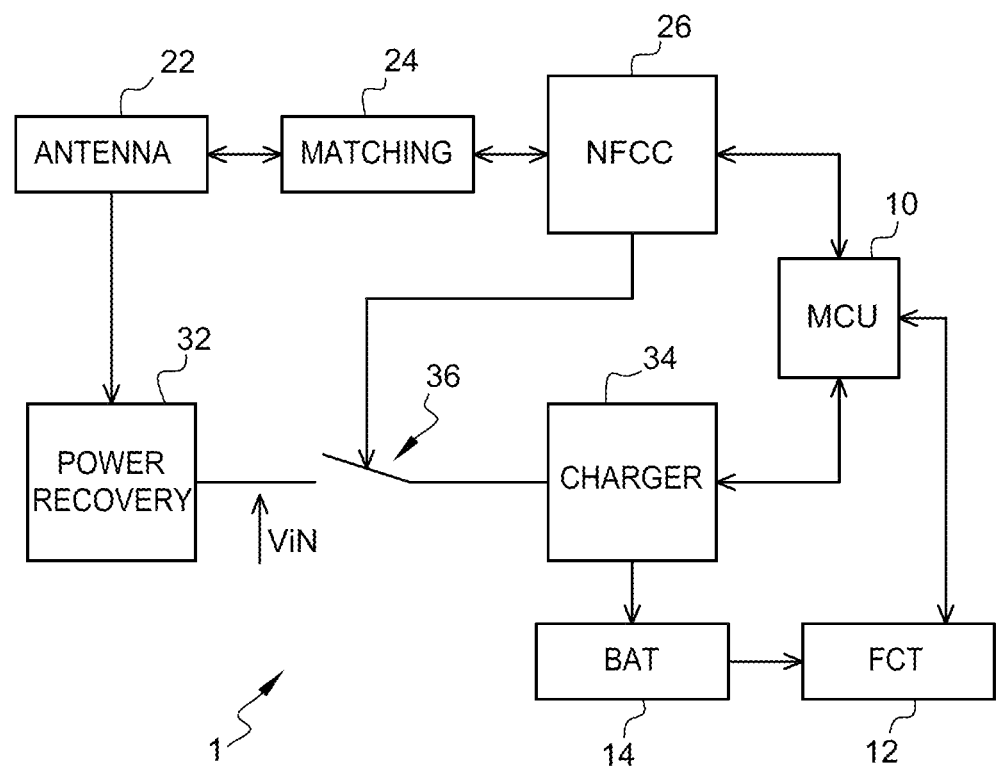
FIG. 1 shows one embodiment of a device 1 adapted to operate NFC communications and NFC charging, very schematically and in block form.

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Numerous near field communication devices such as battery-operated smartphones can also be charged from an electromagnetic field. Most often, for charging functions, these devices use a technology other than NFC technology (from the NFC Forum), namely a lower frequency technology, generally known as Qi. This then requires equipping the device with antennas and circuits dedicated to each function.

Due to space constraints, such a solution is unsuitable for small devices such as those generally referred to as Internet of Things (IoT) devices.

According to the described embodiments, solutions are provided that make it possible to have NFC-type near field communications and WLC wireless charging functions that have a smaller footprint and are compatible with objects of small dimensions. "Small dimensions" refers to objects (such as a watch, a temperature sensor, etc.) that must integrate NFC and charging circuits in a volume of less than one cubic centimeter, preferably between 0.3 and 0.5 cubic centimeters, and even more preferably of the order of 0.4 cubic centimeters, in addition to their own function.

While the embodiments are more particularly described in relation to application to IoT-type devices, it will be noted that they apply more generally to any NFC-type device, regardless of its dimensions.

Wireless charging using NFC technology is emerging. The NFC Forum defines criteria for wireless charging (WLC) using NFC technology in the "NFC Forum wireless charging" Section.

According to the described embodiments, a 13.56 MHz radio frequency field is used for: near field communications (NFC) in drive and card mode; and wireless charging (WLC) in charger or receiver mode.

The described embodiments provide a novel electronic device architecture, adapted to make both NFC communications and NFC (WLC) charging possible, as well as embodiments that make both NFC communications and NFC (WLC) charging possible.

Using an IoT device as an example, NFC charging can be used to charge the IoT device with a smartphone. The IoT device includes, inter alia: an NFC controller configured to implement NFC communications in drive (reader) mode or card mode (typically referred to as legacy mode) and a wireless charging protocol; a charging path configured to convert the received 13.56 MHz radio frequency signal into a continuous signal, to charge a battery via a charging circuit or chip; and a microcontroller configured to control exchanges or communications between the charger chip and the NFC controller, as well as preferably with the other functions of the IoT device.

FIG. 1 shows, very schematically and in block form, one embodiment of a device 1 adapted to operate for both NFC communications and NFC charging.

According to this embodiment, the device 1 according to the proposed architecture comprises a microcontroller 10 (MCU) whose role, inter alia, is to construct (generate) the messages to be transmitted, to provide the rest of the system with information on the battery charge state and field strength requirements, in order to update data packets in a NFC data exchange format (NDEF). The microcontroller communicates in particular with the NFC transmit/receive circuits, the other functions of the device 1, symbolized by a block 12 (FCT), as well as the battery charging circuits 14 (BAT). The charging circuits are internal to the device 1. In an IoT device, the battery 14 is also internal to the device 1.

The NFC transmit/receive circuits or NFC communication chain include an antenna 22 (ANTENNA) connected via a circuit or impedance matching network 24 (MATCHING) to an NFC controller 26 (NFCC) or contactless frontend (CLF) in charge of shaping the signals received from the antenna 22 for the microcontroller 10 (or directly, for other functions of the device 1) and the data to be transmitted, provided by the microcontroller 10 (or directly, by other functions of the device 1).

Depending on the operating situation, the NFC circuits draw the power required for their operation from the battery 14 or directly from the field picked up by the antenna 22.

According to the described embodiments, the charging circuits exploit the same antenna 22 as the NFC communication circuits to extract energy from a charging field. To do so, a power recovery circuit 32 (POWER RECOVERY) or AC/DC converter is connected to the antenna 22 and further connected to a charging circuit 34 (CHARGER) of the battery 14 via a switch 36. The circuit 32 converts a DC voltage VIN serving to supply the charging circuit 34, inter alia, from a radio frequency field, transmitted by a device in charging mode, for example. The circuit 32 includes a diode bridge, in a simplified way, for example. The role of the switch 36 is to disconnect the charging branch, in particular when the device is in NFC communication mode, as will be detailed later.

Figure 2A:
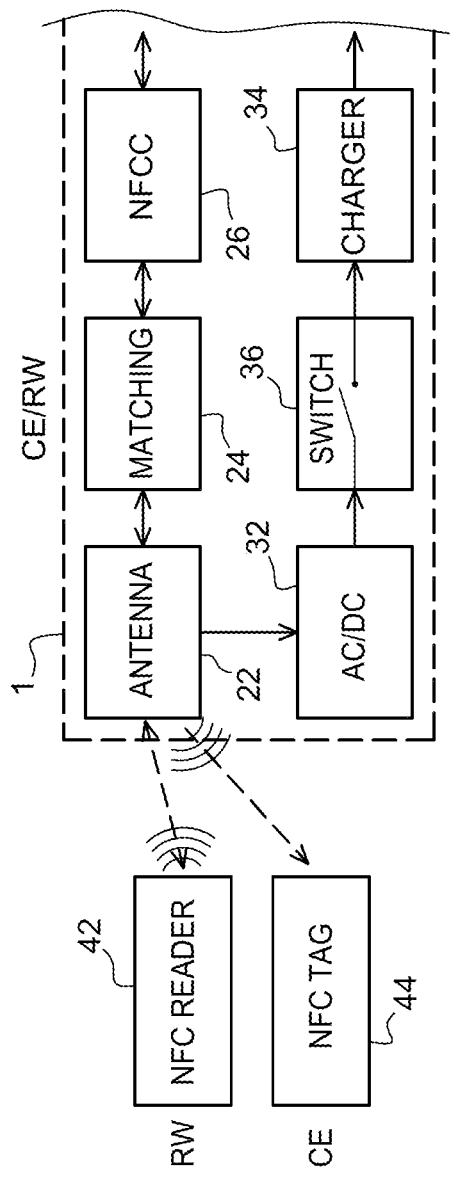
FIGS. 2A and 2B illustrate overviews of an NFC communication system and a WLC wireless charging system respectively, very schematically and in block form.
Figure 2B:
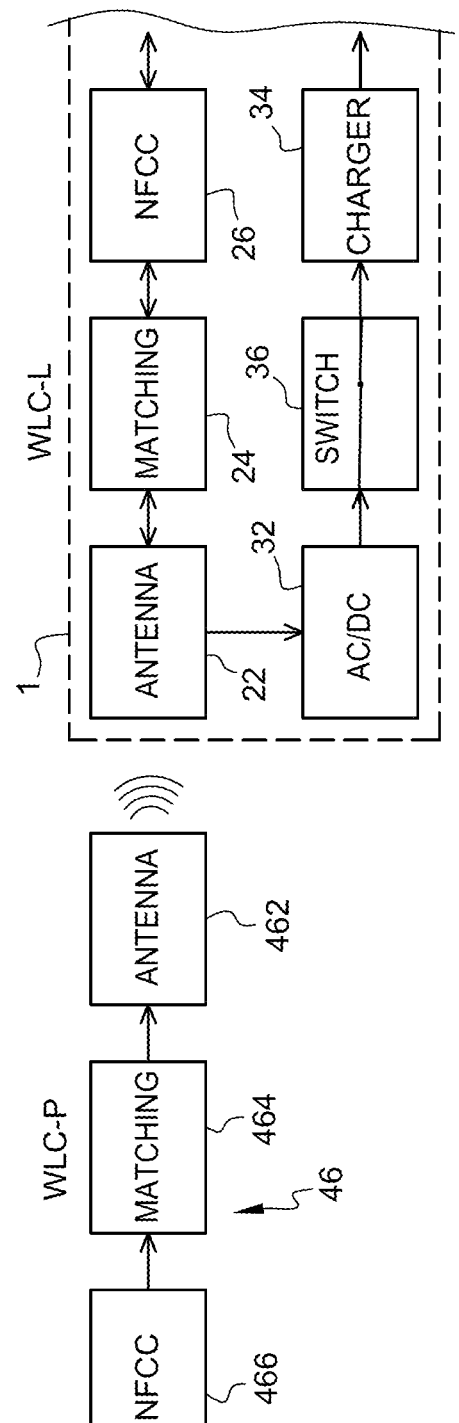

FIGS. 2A and 2B illustrate, respectively, in a very schematic way and in block form, overviews of an NFC communication system and a wireless charging system.

In both cases, the system uses a device 1 of the type described in connection with FIG. 1, with an architecture sharing the same antenna 22 and preferably the same power recovery circuit 32 between an NFC communication branch and an NFC charging branch.

For simplicity, not all circuits of the device 1 have been shown in FIGS. 2A and 2B. Only the antenna 22, the matching circuit 24, the NFC controller 26, the power recovery circuit or AC/DC converter 32, the switch 36 (SWITCH), and the charging circuit 34 have been shown.

FIG. 2A illustrates the two NFC communication operational modes (CE/RW) in which the device 1 may be operated.

The device 1 can operate in card emulation mode (CE) when it is within range of a device 42 (NFC READER) operating in reader or read/write (RW) mode. In this case, the switch 36 is opened to disconnect the charging branch. The NFC communication branch is active and the NFC controller and other circuits are powered by the battery, as will be discussed in more detail in connection with FIG. 4.

The device 1 can also operate in drive (reader) mode, also called read/write (RW) mode. It then generates a radio frequency field to a tag 44 (NFC TAG) operating in card emulation mode (CE). The switch 36 is also opened to disconnect the charging branch. The NFC communication branch is active and draws the power required for its operation from the battery of the device 1.

FIG. 2B illustrates a charging embodiment in which the device 1 is within range of an NFC charging field emitted by a device 46 operating in wireless charging polling mode (WLC-P) or by a charger or polling circuit device. The device 46 is a smartphone intended for charging a connected object (IoT), for example. With the device 46 configured to operate NFC-type wireless charging, it comprises, inter alia, an NFC controller 466 (NFCC), an impedance matching circuit 464 (MATCHING) and an antenna 462 (ANTENNA). On the device side, the device 1 operates as a wireless charging listener (WLC-L) or receiver or listener device, such as a charging device. In this configuration, the switch 36 is closed so as to make it possible for the converter 32 to supply the power, taken from the field radiated by the charging device 46, to the charging circuit 34, so as to charge the battery (not shown in FIG. 2B). The communication branch (in particular the network 24 and the controller 26) remains active, in particular to determine that the remote device is a charging device and thus to be able to close the switch 36 and establish the charging level based on the charger capabilities, if necessary. In particular, the device 1 can exchange its wireless charging capabilities with the NFC charging device 46 in an NFC data exchange format (NDEF), which can then be interpreted by the NFC controller 26.

The architecture described for the device 1 is compatible with usual NFC communication operations, whether in card or polling mode. However, in order to avoid the presence of the charge path disrupting communications and generating losses, in particular, the switch 36 is opened as soon as the embodiment is in NFC communication mode, whether in drive (reader) mode or in card mode.

Figure 3:
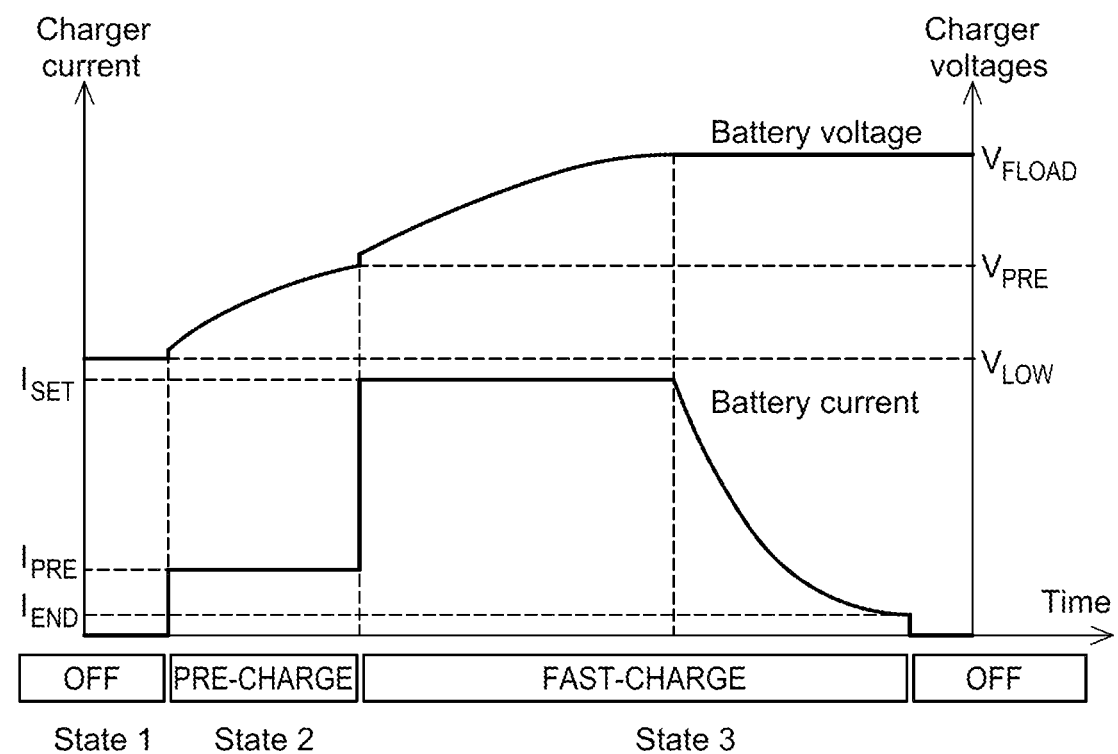
FIG. 3 schematically illustrates a battery charging cycle, in the form of a timing diagram.

FIG. 3 schematically illustrates a battery charging cycle in the form of a timing diagram.

The graph of FIG. 3 shows examples of the evolution of the battery current and voltage, and indicates the charger current supplied by the charging circuit 34 and the charger voltages of the charging circuit 34, based on time, for three different states (State 1, State 2, State 3).

State 1 corresponds to a state in which the charger 34 is off. This may also correspond to a state in which the battery is off, for example where its charge is insufficient to operate the circuits of the device 1. In the example shown in FIG. 3, which illustrates a charging cycle, the OFF state (the charger 34 not supplying power to the battery) is present while the battery is discharged (battery voltage at a VLOW level). The OFF state is also present after the battery has been fully charged. The battery voltage is then at a VFLOAD level and the charge current is zero.

State 2 corresponds to a pre-charge state in which the battery voltage level is low, for example below a threshold VPRE. In this state, a pre-charge step (PRE-CHARGE) can be carried out with a limited current (IPRE) and under a limited voltage (VPRE), in order not to damage the battery.

State 3 corresponds to a fast charge state in which the battery voltage level is sufficiently high, for example above the threshold VPRE. In this state, it is possible to implement a fast charge step (FAST-CHARGE) with a higher constant current (ISET), higher than the limited current IPRE, and reach a VFLOAD voltage, or maximum. When the battery reaches the VFLOAD voltage, the charger switches to a constant voltage phase. The charge current drawn on the charger 34 by the battery decreases progressively until a level LEND is reached, at which point the charge is considered complete.

The charger is then returned to OFF by opening the switch 36 (charge current zero).

In the implementation and embodiments described below, advantage is intended to be taken of the presence of the switch 36 to share the same antenna 22 for wireless charging of the battery 14 and for near field communications.

Figure 4:
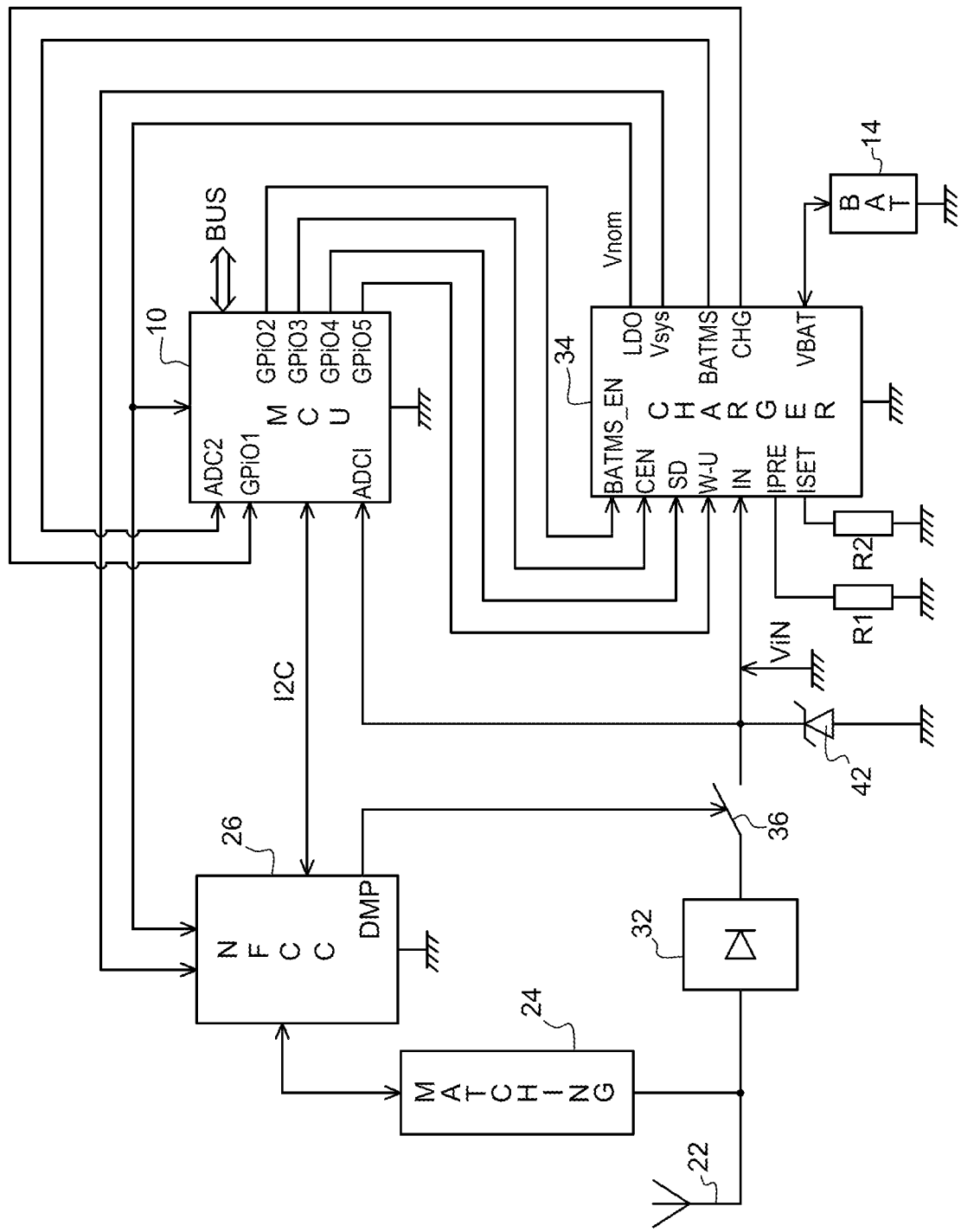
FIG. 4 shows one embodiment of a device adapted to operate NFC communications and WLC charging, in greater detail than in FIG. 1.

FIG. 4 shows one embodiment of a device 1, in greater detail than in FIG. 1.

More particularly, FIG. 4 details certain connections between the circuits of the device 1 for implementing the solutions described.

For simplicity, only those connections useful for understanding the powering and charging functionalities have been shown and will be described. Other connections between the circuits of FIG. 4 and other circuits of the device 1 not shown do exist but have not been detailed. Again, for simplicity, the same terminology and reference may be used to designate a signal and an input terminal to which it is applied, or an output terminal providing that signal.

According to the described embodiments, the same antenna 22 is connected to the impedance matching network 24 intended for NFC communications and to the energy recovery device 32, such as a rectifier bridge associated at the output to a smoothing capacitor (not shown). These connections are considered arbitrarily to define an NFC communication branch and a wireless charging branch, respectively.

On the charging branch side, the output of the energy recovery circuit 32 is connected to an input or power supply terminal IN of the charger circuit 34 via the switch 36. A voltage-limiting element 42, simplified to a Zener diode, limits (peaks) the rectified voltage from the device 32 to a VIN value of the order of 6.0 volts, for example, with the anode of the diode 42 on the ground side. The VIN voltage is also provided to an input ADC1 of an analog-to-digital converter of the microcontroller 10 to determine the VIN voltage level and, while the device 2 is in WLC-L mode, to make it possible to regulate the power provided by the charger device operating in WLC-P mode based on the VIN voltage. If necessary, the measurement is carried out via a voltage divider not shown (the microcontroller is supplied with a voltage of the order of 3 volts, for example, whereas the VIN voltage can typically reach the order of 6 volts).

According to the embodiment shown, the diode 42 is downstream of the switch 36, so that it is only connected to the antenna 22 in battery charging mode.

The charger 34 receives control signals from the microcontroller 10 and more particularly a wake-up (W-U) signal for outputting the very low power mode (typically of the order of 10 nA, often referred to as shipping mode), a signal BATMS-EN for enabling the measurement of the voltage level of the battery 14, a shutdown (SD) signal for deactivating the charger, to switch to the very low power mode, and a signal CEN for resetting the charger status machine or suspending charging. These signals are provided by the microcontroller 10 from general purpose input/output (GPIO) terminals GPIO5, GPIO4, GPIO3 and GPIO2, respectively.

At the energy outputs VBAT, Vsys, and LDO, the charger 34 provides a voltage to the respective battery, a system voltage Vsys having either the VIN value from the device 32 or the VBAT value provided by the battery 10, and a nominal voltage Vnom that is regulated (at 3.0 volts, for example) from the energy provided by the battery. The Vnom voltage is provided by a linear low drop-out (LDO) regulator that the charger 34 comprises, for example. The VBAT terminal is an input/output VBAT terminal of the charger 34 connected to the battery (at its positive terminal), to charge it or to draw energy from it.

The Vnom voltage is supplied to the microcontroller 10 and to the NFC controller 26, inter alia. The Vsys voltage is supplied only to the NFC controller. This supply voltage dissociation is mainly due to the fact that the LDO linear regulator has a limited current capacity (of the order of 150 mA), for example, whereas the NFC controller 26 can require up to 400 mA in drive (reader) mode, and 200 mA in card mode. Furthermore, the 3 V voltage supplied by the LDO linear regulator limits the radio frequency performance of the NFC controller. Since the Vsys voltage corresponds to the VBAT battery voltage, which is then greater than 3 volts when the switch 36 is open (no charging in progress), NFC performance is better. In contrast, it is necessary to supply the VPSIO input on the NFC controller 26 with the LDO linear regulator because the VPSIO input is used as a voltage reference for the GPIO and I2C inputs/outputs connected to the microcontroller 10.

The charger 34 also provides BATMS and CHG signals to the microcontroller 10.

The BATMS signal corresponds to the battery voltage measurement, to evaluate the charge level. To avoid overconsumption in a divider bridge (not shown) connected between the BATMS terminal and a terminal ADC2 of an analog-to-digital converter of the microcontroller 10, measurement is activated by BATMS_EN (BATMS shows the battery voltage only if BATMS_EN is at 1).

The CHG signal indicates the stage the charger status machine is in, typically VIN invalid/VIN valid/charging/end of charging/charging timeout (after 30 minutes of precharging or 5 hours of fast charging)/overcharge error/low battery voltage error (VBAT<VPRE) during fast charging/ charger overheating error/battery overheating error. The states are coded by high/low levels of the CHG signal at a frequency of a few Hertz. The CHG signal is supplied to the microcontroller 10 on a general purpose input/output (GPIO1) terminal, for example.

The battery charge current intensity, between the precharge current IPRE and the fast charge current ISET, is conditional on the connection (internal to the charger 34) of a respective resistor R1, R2, connecting the respective IPRE and ISET terminals of the charger 34 to ground.

On the communication branch side, the impedance matching circuit 24 is connected to the NFC controller 26. The NFC controller is connected to the microcontroller 10 at least via a bidirectional bus I2C for exchanging data received via and to be transmitted. The controller 26 provides a control signal at a DMP terminal for the switch 36 to open or close, based on operating conditions.

The microcontroller 10 exchanges signals with other circuits not shown in the device 1. A bus (BUS) symbolizes the links for these exchanges.

The described architecture is adapted to different embodiments and implementations.

In particular, the operation and controls will differ depending on whether the switch 36 is normally open or normally closed. Preferably, the switch is of the normally open type, which makes it possible to obtain optimal NFC performance in card and drive mode. Closure thereof is triggered when a WLC-P charging device is detected through the data exchange, to start charging the battery.

Figure 5:
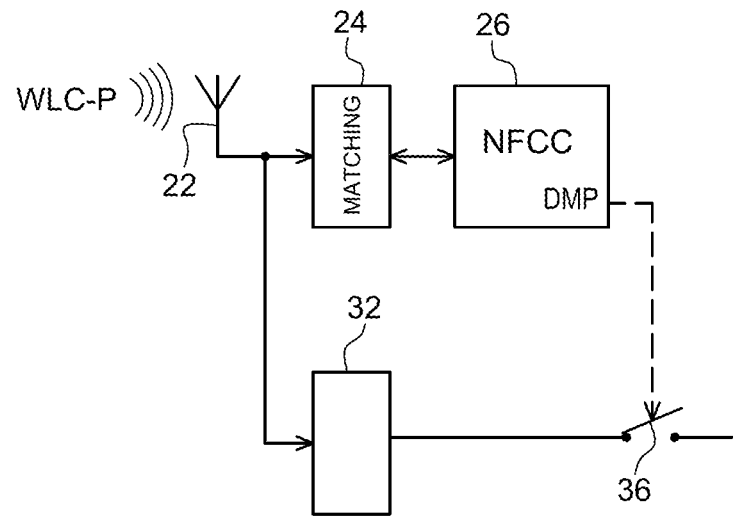
FIG. 5 schematically illustrates a state of the architecture illustrated in FIG. 4.
Figure 6:
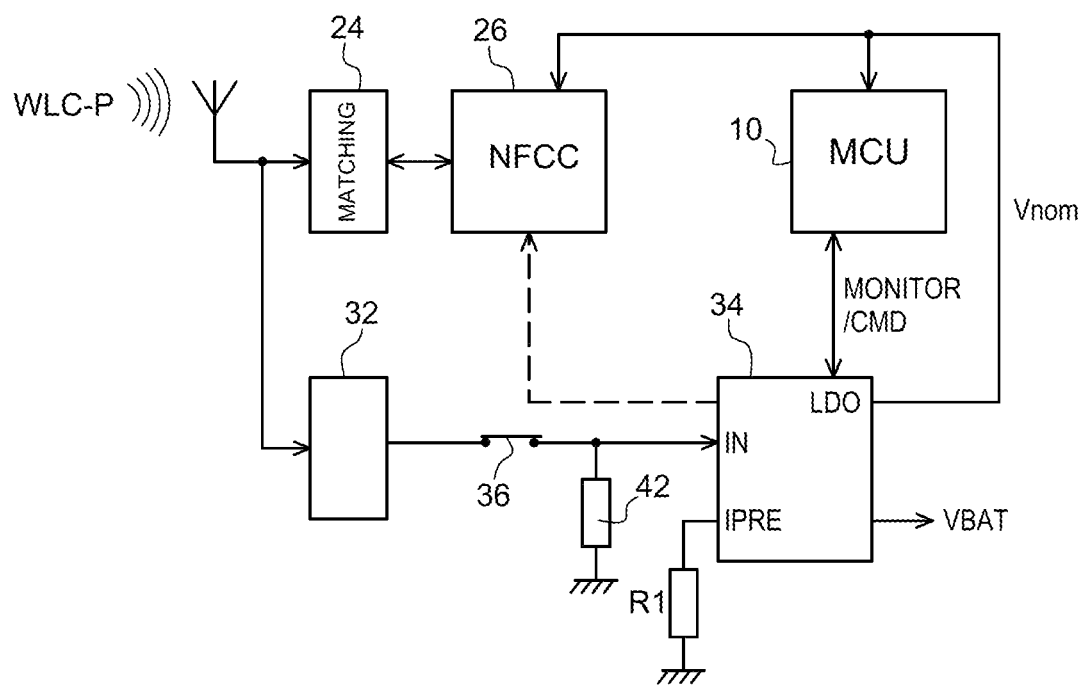
FIG. 6 schematically illustrates another state of the architecture illustrated in FIG. 4.
Figure 7:
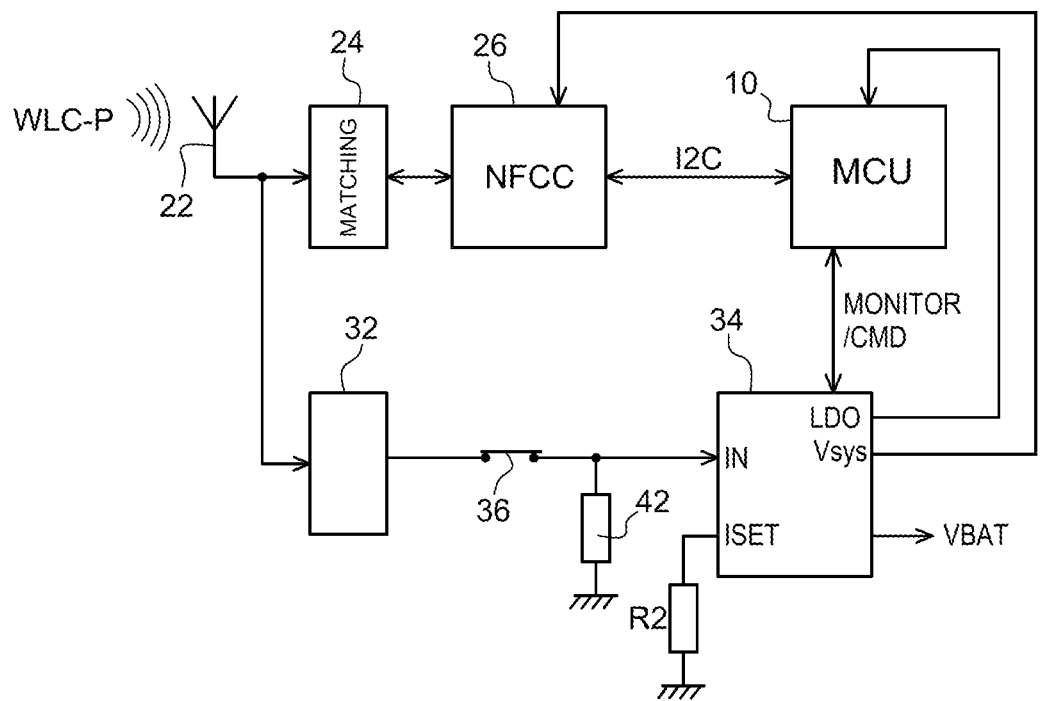
FIG. 7 schematically illustrates another state of the architecture shown in FIG. 4.

FIGS. 5 to 7 illustrate different operating phases of a device 1 as described above, in the presence of a field generated by a WLC-P charging device picked up by the antenna 22. These figures partly repeat certain elements of the architecture described above, based on the circuits used in the different situations.

FIG. 5 schematically illustrates a state of the architecture illustrated in FIG. 4.

FIG. 5 corresponds to State 1 (FIG. 3) in which the battery is off or is insufficiently charged to operate any power supply to the circuits. The battery has a voltage of less than 2.8 volts at its terminals, for example.

In this state, the microcontroller 10 is in low power mode, being powered by the linear regulator, and the NFC controller 26 is powered by the field via the circuit 32.

The controller 26 emulates a tag operation and sends a message WLC_CAP only supporting static mode, in order to initiate a pre-charge when a WLC-P charging device is within range.

If the switch 36 is normally open, the controller 26 causes it to close by changing the state of the DMP signal. If switch 36 is normally closed, the state of the DMP signal is not changed.

FIG. 6 schematically illustrates another state of the architecture illustrated in FIG. 4.

FIG. 6 corresponds to pre-charge state 2 (State 2) in which the battery 14 cannot sustain a fast charge by the charging device 34. This corresponds to a state in which the battery 14 has a voltage across its terminals of less than the VPRE voltage (such as less than 3.0 volts), for example.

In this state, the WLC-P charging device sends a static charge level, such as a default field level for a device that has communicated a WLC_CAP message requesting static mode charging. The battery begins to be charged by the field. The battery charge current is limited to the IPRE level by the activated resistor R1.

The microcontroller 10 may begin to be powered by the battery through the charger 34 when the battery level is sufficient, with the LDO regulator internal to the charger 34 providing the Vnom voltage (for example, 3.0 volts). The microcontroller 10 may then begin communicating with the charger 34 to monitor (MONITOR) the battery charge level and charger operation (BATMS and CHG signals) and to control (CMD) the charger (BAMTS-EN, CEN, SD and W-U signals).

Preferably, the NFC controller 26 begins to be powered by the Vnom voltage, thus by the battery, as soon as its charge level is sufficiently high (above a threshold). One advantage is that if the state of the microcontroller 10 changes (such as a need for communication) and consequently the current consumption changes, this will not affect the field level radiated by the WLC-P charging device. There is then no risk of triggering a so-called "foreign object detection" mechanism on the charging device side. In this state, the battery charger provides a constant charge current to the battery, drawn from the field by the voltage, VIN and the power required by the system is drawn from the battery via the Vsys and LDO power outputs.

Preferably, the controller 26 remains in static mode and cannot switch to drive (reader) mode until the charge level is sufficient. To do so, a direct link (dotted line in FIG. 6) is provided between the charger 34 and the controller 26, to make it possible for the charger 34 to indicate to the controller 26 when the charge level becomes sufficient. Also, preferably, the microcontroller 10 remains in static mode (limited power consumption) until the charge level is sufficient.

FIG. 7 schematically illustrates another state of the architecture illustrated in FIG. 4.

FIG. 7 corresponds to state 3, of fast charging, in which the WLC-P charging device can provide sufficient power to charge the battery 14 to its VFLOAD maximum. This corresponds to a state in which the battery has a voltage between the pre-charge level VPRE and its VFLOAD maximum voltage at its terminals, for example.

In this state, the WLC-P charging device can be placed in a negotiated level with the WLC-L receiver (device 1). To do this, the microcontroller 10 commands the NFC controller to send a WLC_CAP message to the WLC-P device to communicate the battery's charging capacity. One of the fields in the WLC_CAP message indicates a request to switch to negotiated mode. The battery is then powered by the field. Monitoring of the field is available at the microcontroller 10 (preferably, the microcontroller 10 is powered by the Vnom voltage and the NFC controller 26 is powered by the Vsys voltage).

In a variant, as soon as the charge level is sufficient for the NFC controller and microcontroller to be powered, the microcontroller monitors the received power. It then generates a control signal for the charger 34 to regulate the charge current. This maximizes the received power consumption. In other words, this corresponds to matching the available power generated by the WLC-P charging device to the current drawn by the battery to charge it.

Figure 8:
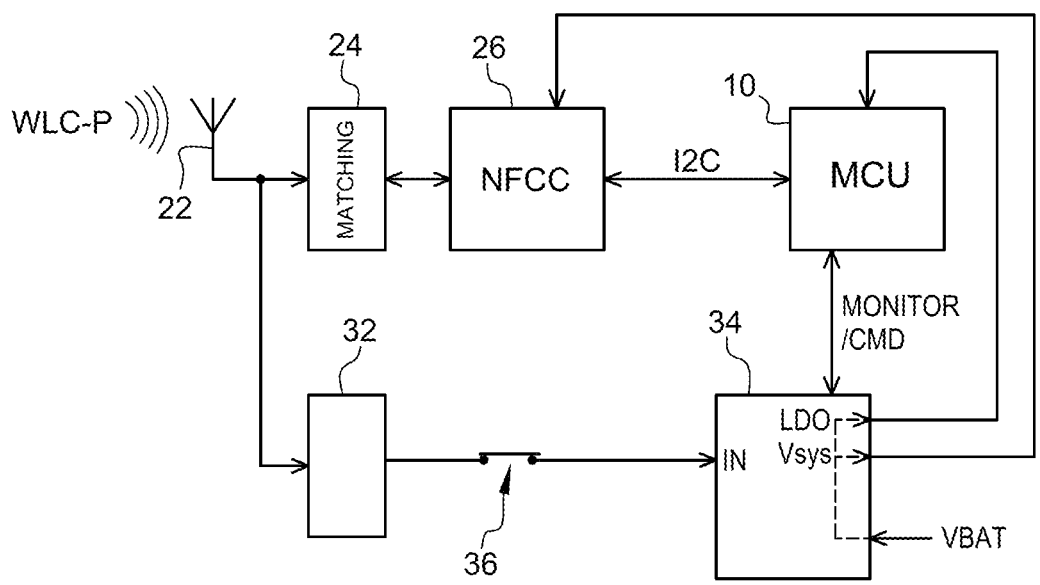
FIG. 8 schematically illustrates another embodiment of a device according to the architecture of FIG. 4.

FIG. 8 schematically illustrates another embodiment of a device according to the architecture of FIG. 4.

FIG. 8 illustrates a state in which the device 1 establishes communication according to the WLC standard with the charging device, such as using the WLC protocol as defined in the NFC Forum, while charging the battery from a WLC-P charging device.

In this embodiment, the charging device puts itself into a static field level in order to make communication possible. In other words, it reduces the field generated, but energy is still drawn by the charger 34 in order to continue charging the battery 14. However, the two resistors R1 and R2 are deactivated because they are not useful. In such a situation, the battery charge level is effectively sufficient, so that the resistor that would be activated would be the resistor R2, but it is not useful insofar as the power of the field radiated by the charging device is controlled by the charging device.

In this embodiment, the microcontroller 10 and the NFC controller 26 are powered by the battery. The communication itself uses the NFC controller 26 and the microcontroller 10.

Figure 9:
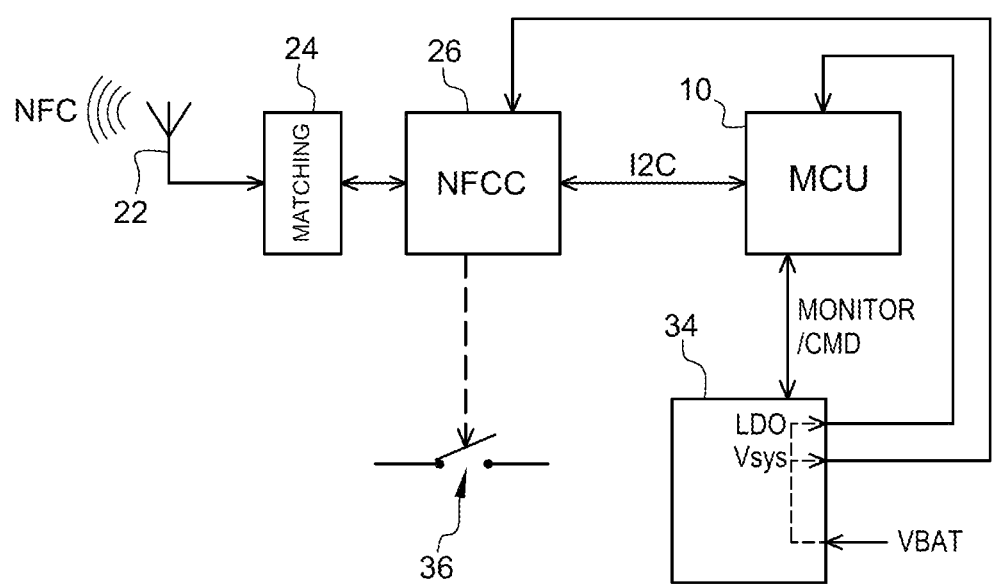
FIG. 9 schematically illustrates another embodiment of a device according to the architecture of FIG. 4.

FIG. 9 schematically illustrates another embodiment of a device according to the architecture of FIG. 4.

FIG. 9 illustrates a state in which the device 1 is used as an NFC device in drive (reader) mode, such as to generate a field and to communicate with an external NFC tag.

In this state, referred to as NFC Tx mode, the controller 26 causes the switch 36 to open so as to disconnect the charging branch circuits downstream of the switch 36. The device 1 generates a field (via the NFC controller 24 and the antenna 22) to communicate with an external NFC tag. The NFC controller 26 and microcontroller 10 are powered by the battery.

Preferably, according to another embodiment in which the power recovery circuit 32 comprises diode rectifier elements, the parasitic capacitances of the diodes are taken into account when sizing the matching circuits 24.

The operation in NFC drive mode, for communication, is otherwise standard.

The described architecture supports different embodiments, in particular depending on whether the switch 36 is normally open or normally closed and whether the NFC controller 36 is powered.

According to one embodiment where the switch 36 is of the normally open type, the charge path does not disturb operation of the device in the NFC communication mode (other than adaptation due to the power recovery circuit).

When the controller 26 detects that the field is generated by a WLC-P charging device, the controller 26 causes the switch 36 to close in order to connect the charger 34 to the energy recovery circuit. As mentioned above, the controller 26 emulates a tag operation and sends a WLC_CAP message supporting only static mode.

Typically, the process is as follows. The reader or charger detecting a tag (the device 1 emulates a tag) performs an anti-collision procedure according to the ISO14443/EMVCo contactless standard or according to the NFC Forum. Then the reader sends its application identifier (AID), which specifies the application supported by the reader, such as "Payment", "Transport" or "NFC Forum". These identifiers are defined in the ISO7816-4 standard. For example, if the identifier corresponds to the standardized code D2760000850101 (NDEF tag application), the device 1 presents the NDEF message it wants according to the desired exchange (a WLC-CAP message where it wishes to be charged).

In states 1 and 2 (FIG. 3), the device 1 will emulate a WLC_CAP NDEF tag where a reader sends an NFC Forum compliant application identifier. In state 3, the device 1 is fully functional. The device 1 may thus send a more complex NDEF message, including a WLC_CAP message, a (Wi-Fi or Bluetooth), pairing request, a virtual card (vCARD), etc., for example, based on what the user does.

According to one embodiment where the switch 36 is normally closed, the default operation is charging the battery. The controller 26 then causes it to open to perform NFC communications. Such communications are typically established either in drive mode by drawing power from the battery, or in card mode by drawing power from the field in which the device 1 is located.

Figure 10:
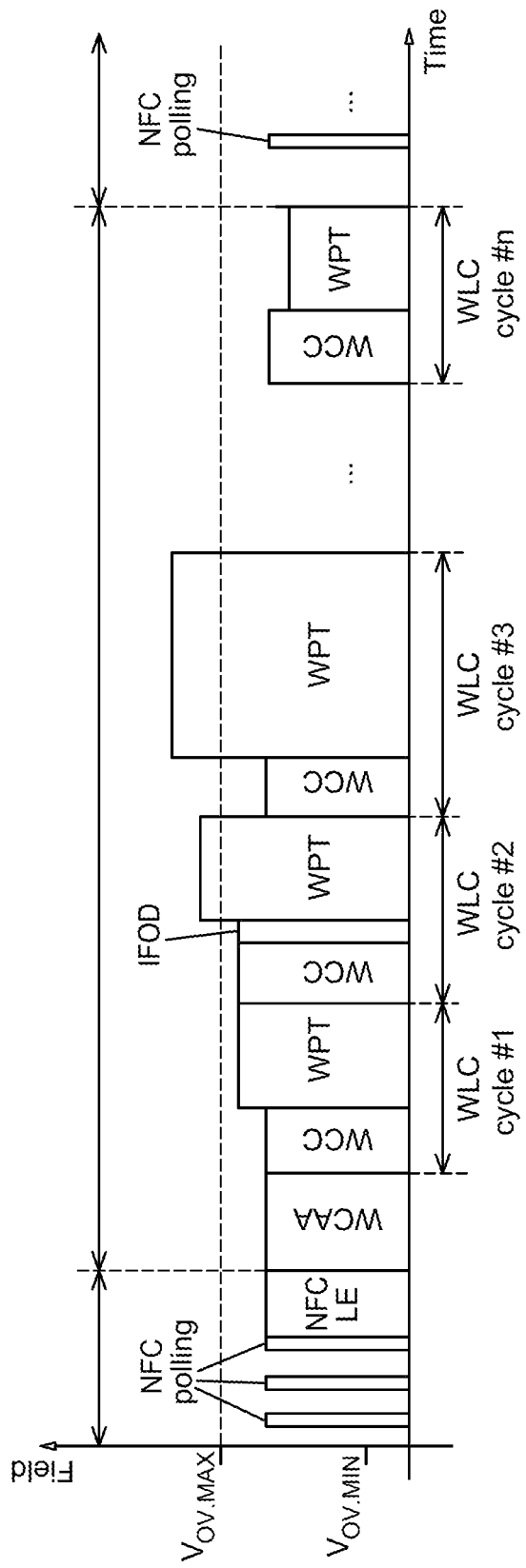
FIG. 10 illustrates different embodiments or states of a device according to the architecture of FIG. 4, by means of a timing diagram.

FIG. 10 is a timing diagram illustrating the operation of a WLC-P charging device in the presence of a WLC-L charging device in its field.

This timing diagram shows an example of field strength over time.

At rest, the charging device periodically emits field bursts (NFC polling). When it detects the presence of an object in its field, it initiates an anti-collision procedure (NFC LE).

Then, in an initial phase of wireless charging control activation (WCCA), as mentioned above, the reader emits its application identifier and the device 1, emulating a tag, emits an NDEF WLC_CAP message, which is read by the reader.

Wireless charging then begins and comprises a succession of n charging cycles (WLC cycle #1, WLC cycle #2, WLC cycle #3, . . . , WLC cycle #n). Each charging cycle comprises a phase of wireless charging control (WCC) followed by a phase of wireless power transfer (WPT). Depending on the mode (static or negotiated) contained in the WLC_CAP message sent by the device 1 during a WCC phase, the field strength emitted by the reader during the WPT phase is more or less important. In particular, in negotiated mode, the voltage exceeds a maximum threshold $V_{OV\_MAX}$ while in static mode, the voltage remains between a minimum threshold $V_{OV\_MIN}$ and the threshold $V_{OV\_MAX}$. If necessary, at the end of the transfer phase, the reader interposes a foreign object detection IFOD phase before the next WCC phase.

Once charging is complete (at the end of the nth cycle), the reader goes back into polling mode.

Whatever the embodiment, it is preferably provided that the controller 26, in battery charging mode, is switched to standby mode during charging phases. Indeed, according to the WLC protocol, the charging device transmits successive charging frames separated by command exchange frames, making it possible to adjust the field power. The controller 26 can then be placed in sleep mode at the end of each command exchange frame.

In other words, at the end of sending a WLC_CAP message in static mode or a WLC_CTL message in negotiated mode intended for the charging device, the NFC controller 26 goes into standby mode to reduce power consumption and increase charging efficiency.

During the charging phase, including while in standby mode, the NFC controller (or microcontroller 10) nonetheless monitors the received field in order to detect an end of a charging cycle and the need to present a new WLC_CAP or WLC_CTL message. In case of transition in the received field level, if the field drops below a custom threshold (chosen based on characteristics of the device 1), the NFC controller wakes up and:

if this is the end of the charging phase and the start of a communication phase: the NFC controller makes the communication to continue the charging protocol; and if no WLC-P field is detected: the charging process is terminated. This corresponds to the case where either the device 1 is no longer within range of the WLC-P device, or the WLC-P device has stopped emitting a field.

The following Table 1 summarizes an example of the LDO and Vsys voltage levels (FIG. 4) based on a Vth threshold value of the VIN voltage and the VBAT voltage level. In this particular example, the V_PRE value is 3 volts, the V_LOW value is 2.8 volts and the Vth value is 3.9 volts.

TABLE 1

| VIN | VBAT | LDO | Vsys |
|---|---|---|---|
| VIN > Vth | VBAT > V_PRE | 3V (from VIN) | VIN |
| VIN > Vth | V_LOW < VBAT < V_PRE | 3V (from VIN) | VIN |
| VIN > Vth | VBAT < V_LOW | 3V (from VIN) | VIN |
| VIN < Vth | VBAT > V_PRE | 3V (from VBAT) | VBAT |
| VIN < Vth | V_LOW < VBAT < V_PRE | VBAT (controller in tracking mode) | VBAT |
| VIN < Vth | VBAT < V_LOW | 0 (OFF) | 0 (OFF) |

In a variant, when the VIN voltage is higher than Vth and the VBAT voltage is higher than V_PRE (first line of the table), the Vsys voltage is supplied by the battery Vsys=VBAT and the LDO regulator draws its energy from VBAT instead of VIN.

One advantage of the described embodiments is that they make it possible to pool the antenna, and preferably the power recovery circuit for NFC communication and NFC charging operations.

Another advantage of the described embodiments is that they are compatible with the protocols defined by the NFC Forum.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. A device, comprising:
   an NFC controller;
   a microcontroller;
   a battery charging circuit;
   an energy recovery device;
   an antenna; and
   a switch that is controlled by the NFC controller to selectively couple the energy recovery device to the battery charging circuit;
   wherein the microcontroller is configured to generate a control signal for controlling operation of the battery charging circuit; and
   wherein the battery charging circuit is configured to measure a battery voltage level of a battery and output a charge current for application to the battery, said charge current being regulated at a constant current level, when the measured battery voltage level is between a first voltage level and second voltage level.

2. The device according to claim 1, wherein said switch is in an open state during NFC communications using drive-reader mode or card mode.

3. The device according to claim 2, wherein said switch is in a closed state during wireless charging cycles.

4. The device according to claim 1, wherein said charge current is adjusted based on available field energy from a field emitted by an external charging device.

5. The device according to claim 4, wherein at least the NFC controller and the battery charging circuit are powered by said field.

6. The device according to claim 5 wherein the microcontroller is also powered by the field.

7. The device according to claim 1, wherein the microcontroller and/or the NFC controller is powered, in the presence of a field emitted by an external charging device, by the battery when the battery charge level is above a threshold.

8. The device according to claim 1, wherein the NFC controller, in the presence of a field emitted by an external charging device, is configured to enter a standby mode during charging cycles.

9. The device according to claim 1, wherein the microcontroller, in the presence of a field emitted by an external charging device, monitors the power available at an input of the battery charging circuit.

10. The device according to claim 1, wherein the switch is of a type that is normally open.

11. The device according to claim 10, wherein the NFC controller, in response to detection of an external wireless charging device emitting a field, is configured to close the switch coupling the energy recovery device to the charging circuit.

12. The device according to claim 1, wherein the switch is of a type that is normally closed.

13. The device according to claim 12, wherein the NFC controller, in response to detection of an external wireless charging device emitting a field, is configured to maintain the switch closed for coupling the energy recovery device to the battery charging circuit.

14. The device according to claim 1, wherein the first voltage level is a discharge voltage level of the battery, and the second voltage level is an intermediate voltage level of the battery less than a maximum voltage level of the battery.

15. The device according to claim 1, wherein the first voltage level is an intermediate voltage level of the battery greater than a discharge level of the battery, and the second voltage level is a maximum voltage level of the battery.

16. A method for control, comprising: an NFC controller; a microcontroller; a battery charging circuit; an energy recovery device; an antenna; and a switch between the energy recovery device and the battery charging circuit, wherein the method for control comprises:
   using the NFC controller to selectively control the switch to couple the energy recovery device to the battery charging circuit; and
   generating by the microcontroller of a control signal for controlling operation of the battery charging circuit;
   measuring a battery voltage level of a battery; and
   outputting a charge current from the battery charging circuit, wherein outputting comprises regulating said charge current at a constant current level when the measured battery voltage level is between a first voltage level and second voltage level.

17. The method according to claim 16, further comprising controlling the switch in an open state during NFC communications using drive-reader mode or card mode.

18. The method according to claim 17, further comprising control the switch in a closed state during wireless charging cycles.

19. The method according to claim 17, further comprising:
   determining presence of a field emitted by an external charging device; and
   in response thereto, monitoring power available at an input of the battery charging circuit.

20. The method according to claim 16, further comprising:
   determining presence of a field emitted by an external charging device; and
   in response thereto, powering the microcontroller and/or the NFC controller by the battery when the battery charge level is above a threshold.

21. The method according to claim 16, further comprising:
   determining presence of a field emitted by an external charging device; and
   in response thereto, causing the NFC controller to enter a standby mode during charging cycles.

22. The method according to claim 16, wherein the first voltage level is a discharge voltage level of the battery, and the second voltage level is an intermediate voltage level of the battery less than a maximum voltage level of the battery.

23. The device according to claim 16, wherein the first voltage level is an intermediate voltage level of the battery greater than a discharge level of the battery, and the second voltage level is a maximum voltage level of the battery.

24. A device, comprising:
   an NFC controller;
   a microcontroller;
   a battery charging circuit;
   an energy recovery device;
   an antenna; and
   a switch that is controlled by the NFC controller to selectively couple the energy recovery device to the battery charging circuit;
   wherein the microcontroller is configured to generate a control signal applied to the battery charging circuit for regulating a charge current; and
   wherein the NFC controller and/or microcontroller, in the presence of a field emitted by an external charging device, is blocked from switching into NFC drive-reader mode as long as the charge level of the battery is below a threshold.

25. A method for control, comprising: an NFC controller; a microcontroller; a battery charging circuit; an energy recovery device; an antenna; and a switch between the energy recovery device and the battery charging circuit, the method for control comprising:
   using the NFC controller to selectively control the switch to couple the energy recovery device to the battery charging circuit;
   generating by the microcontroller of a control signal applied to the battery charging circuit for regulating a charge current;
   determining presence of a field emitted by an external charging device; and
   in response thereto, blocking a switching into NFC drive-reader mode as long as the charge level of the battery is below a threshold.

* * * * *